UNITED STATES PATENT OFFICE.

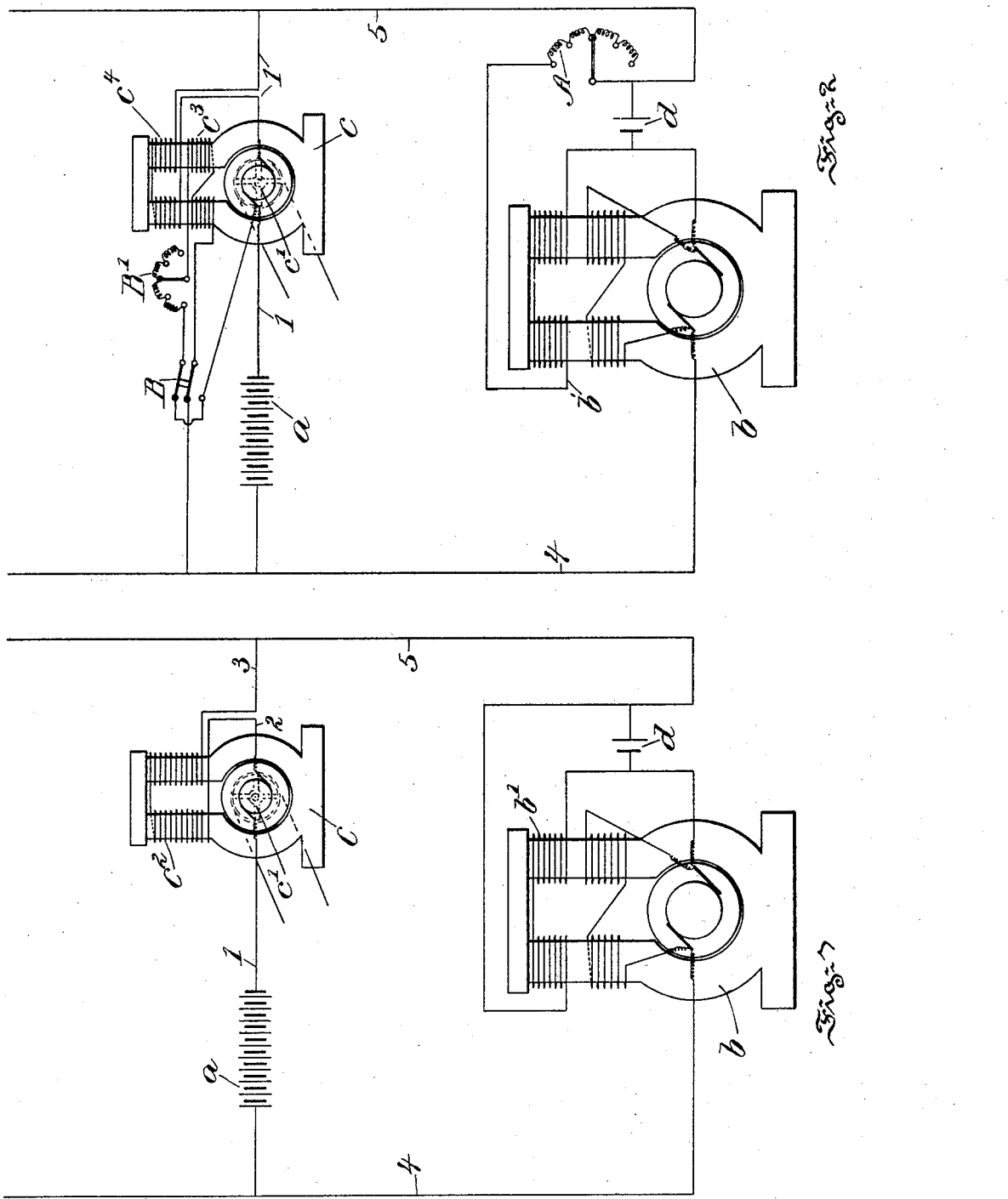

JUSTUS B. ENTZ, OF PHILADELPHIA, PENNSYLVANIA, ASSIGNOR TO THE ELECTRIC STORAGE BATTERY COMPANY, OF NEW JERSEY.

ELECTRICAL DISTRIBUTION BY STORAGE BATTERIES.

SPECIFICATION forming part of Letters Patent No. 625,099, dated May 16, 1899.

Application filed February 3, 1899. Serial No. 704,417. (No model.)

*To all whom it may concern:*

Be it known that I, JUSTUS B. ENTZ, a citizen of the United States, residing at the city of Philadelphia, in the county of Philadelphia and State of Pennsylvania, have invented certain new and useful Improvements in Electrical Distribution by Storage Batteries, of which the following is a specification.

One object of the present invention is to keep the load constant upon a compound-wound generator having a battery arranged in multiple with respect to its leads or working conductors.

To this end my invention comprises the improvements hereinafter described and claimed.

The nature, characteristic features, and scope of my invention will be more fully understood from the following description, taken in connection with the accompanying drawings, forming part hereof, and in which—

Figure 1 is a view diagrammatically illustrating apparatus embodying features of my invention, and Fig. 2 is a similar view illustrating apparatus embodying a modification of my invention.

In the drawings, $a$ is a battery in multiple with a compound-wound generator $b$.

$c$ is a booster having its armature $c'$ interposed in the battery-conductor 1. As shown in Fig. 1, the booster is provided with a series field-coil $c^2$, included in an armature-circuit by means of conductors 2 and 3. As shown in Fig. 2, the field of the booster is energized by a shunt-coil $c^3$ and also by a series coil $c^4$, interposed in the battery-conductor 1.

A is a rheostat in the series field-coil of the generator, B is a reversing-switch, and B' is a rheostat, the last two being interposed in the shunt-field of the booster. Of course the parts B and B' may be assembled in one device.

In order that the battery $a$ in multiple with the generator $b$ shall operate to keep a constant load upon the generator notwithstanding variations of load in the working circuit 4 5, it is necessary that for any increase of load upon the generator its voltage shall fall in order that the battery in multiple with it shall discharge and also that for any decrease of load upon the generator its voltage shall increase in order to charge the battery in multiple with it. The less the battery changes in voltage for a change of current through it, as compared with the generator the better will be the regulation of the load upon the generator $b$. To this end I compound the battery $a$ by means of a booster $c$ in series with it, so as to keep its voltage as equal as possible throughout its range of charge and discharge, and I place a storage battery $d$ of small voltage in multiple with the series field $b'$ of the compound-wound generator. This keeps practically a constant current through the series field of the generator, and thus imparts to the latter the characteristic of a shunt-machine in that the voltage falls for increase of load and rises for a decrease of load. The small battery $d$ in multiple with the series field $b'$ should have a voltage equal to the difference of potential across the series field when the load on the generator is of the amount which it is desired to maintain by means of the storage battery in multiple with the generator. In order to adjust the difference of potential across the series field at different loads to equal that of the small battery, an adjustable resistance A may be placed in series with the series field $b'$ of the generator. Such a small battery is connected across the terminals of the series field and the adjustable resistance, which are in series.

The booster in the battery-circuit may be a series machine, Fig. 1, with its field $c^2$ so adjusted as to compound the battery and keep its voltage constant throughout its entire range of charge and discharge. The booster, Fig. 2, may also have in addition to the series field $c^4$ a shunt-field $c^3$, so as to add or subtract a certain definite voltage to or from that of the battery $a$. In order that the shunt-field of the booster may either add or subtract from the voltage of the battery, it is provided with a reversing-switch B, which will reverse the direction of current through it, as well as with a rheostat B' for changing the amount of current through it.

In the event of a normal load upon the working circuit the generator $b$ takes this load, and its voltage is equal to that of the battery, so that the battery neither charges nor discharges. Upon an increase of load on the working circuit the generator $b$ is called upon to generate more current and might start to supply this increase, but immediately its voltage would fall below that of the battery, so that the battery would take this increased load, and since the battery is compounded by the action of the booster $c$ in such a way that its voltage does not change with change of current through it it will take the increased load, and the load on the generator $b$ will therefore remain constant. In the event of a decrease of load on the working circuit the generator $b$ will be called upon to supply a less quantity of current and its voltage will tend to rise above that of the battery, so that the battery will be charged and the load on the generator will remain constant. In this connection it may be stated that the voltage of the generator $b$ varies inversely as the current which it generates and that the battery is compounded by the booster, so that its voltage does not vary with change of current through it. It may be further stated that in speaking of changes of voltage of the generator $b$ it must be borne in mind that such changes are perhaps more truly tendencies to change, which are checked in their inception by the described action of the battery and its booster.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. The combination in a system of electrical distribution by means of storage batteries, of, a compound-wound generator, a storage battery of small voltage in parallel with the series field of the generator, and a booster and storage battery in multiple with the leads or working conductors, substantially as described.

2. The combination in a system of electrical distribution by means of storage batteries, of, a compound-wound generator, a compound-wound booster and battery in multiple with the leads or working conductors of the generator, and a battery of small voltage in parallel with the series field of the generator, substantially as described.

3. The combination in a system of electrical distribution by means of storage batteries, of, a compound-wound generator, a storage battery of small voltage in parallel with the series field of the generator, a rheostat interposed in the series field of the generator, and a booster and storage battery in multiple with the leads or working conductors, substantially as described.

4. The combination in a system of electrical distribution by means of storage batteries, of, a compound-wound generator, a compound-wound booster and battery in multiple with the leads or working conductors of the generator, means for controlling the strength and direction of current in the constantly-excited field-coil of the booster, and a battery of small voltage in parallel with the series field of the generator, substantially as described.

In testimony whereof I have hereunto signed my name.

JUSTUS B. ENTZ.

In presence of—
ALFRED J. WILKINSON,
W. J. JACKSON.